United States Patent
Kasaba et al.

(10) Patent No.: US 10,120,074 B2
(45) Date of Patent: Nov. 6, 2018

(54) ILLUMINATION DEVICE

(71) Applicant: KOITO MANUFACTURING CO., LTD., Tokyo (JP)

(72) Inventors: Yusuke Kasaba, Shizuoka (JP); Takashi Hori, Shizuoka (JP); Teruaki Yamamoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/675,187

(22) Filed: Aug. 11, 2017

(65) Prior Publication Data
US 2018/0045826 A1 Feb. 15, 2018

(30) Foreign Application Priority Data
Aug. 12, 2016 (JP) .................. 2016-158727

(51) Int. Cl.
| | |
|---|---|
| *G01S 17/02* | (2006.01) |
| *B60Q 1/00* | (2006.01) |
| *B60Q 1/04* | (2006.01) |
| *B60Q 1/30* | (2006.01) |
| *F21V 23/04* | (2006.01) |
| *G01S 17/88* | (2006.01) |
| *G01S 17/42* | (2006.01) |
| *G01S 17/93* | (2006.01) |
| *G01S 7/481* | (2006.01) |
| *B60R 11/00* | (2006.01) |
| *G01S 7/497* | (2006.01) |

(52) U.S. Cl.
CPC .......... *G01S 17/023* (2013.01); *B60Q 1/0023* (2013.01); *B60Q 1/0483* (2013.01); *B60Q 1/302* (2013.01); *F21V 23/0457* (2013.01); *G01S 7/4813* (2013.01); *G01S 17/42* (2013.01); *G01S 17/88* (2013.01); *G01S 17/936* (2013.01); *B60R 2011/0094* (2013.01); *G01S 7/4972* (2013.01)

(58) Field of Classification Search
CPC ..................................................... B60Q 1/0023
USPC .................................................. 362/459–549
See application file for complete search history.

(56) References Cited

U.S. PATENT DOCUMENTS

2006/0250711 A1* 11/2006 Noguchi ........... B32B 17/10036
359/883
2016/0144770 A1* 5/2016 Graf ..................... B60Q 1/0023
362/464

FOREIGN PATENT DOCUMENTS

JP         2010185769 A      8/2010

* cited by examiner

*Primary Examiner* — William Carter
(74) *Attorney, Agent, or Firm* — Osha Liang LLP

(57) ABSTRACT

An illumination device to be mounted on a vehicle, includes a light source; a sensor configured to acquire information outside the vehicle based on invisible light; and a cover including a first portion covering the light source and a second portion covering the sensor. The second portion has a lower visible light transmittance than the first portion.

7 Claims, 4 Drawing Sheets

ILLUMINATION DEVICE

CROSS-REFERENCE TO RELATED APPLICATION

The present application claims priority from Japanese Patent Application No. 2016-158727 filed on Aug. 12, 2016, the entire content of which is incorporated herein by reference.

BACKGROUND

Technical Field

The present invention relates to an illumination device mounted on a vehicle.

Related Art

In order to realize an automatic driving technique of a vehicle, it is necessary to mount a sensor for acquiring information outside the vehicle on a vehicle body. A LiDAR (Light Detection and Ranging) is known as an example of such a sensor (e.g., see Patent Document 1). The LiDAR sensor is a device for emitting invisible light and acquiring information on the distance to an object or the attribute of an object based on the reflected light.

Patent Document 1: Japanese Patent Laid-Open Publication No. 2010-185769

From the viewpoint of efficiently acquiring information around the vehicle and from the viewpoint of design, it is desired to dispose the above-described sensor in a lamp chamber of the illumination device arranged at four corners of the vehicle. However, it is general that the sensor for acquiring information outside the vehicle based on invisible light has a relatively large volume. Thus, the illumination device tends to be large.

SUMMARY

Exemplary embodiments of the invention provide an illumination device which can suppress an increase in size of the illumination device while providing a sensor for acquiring information outside a vehicle based on invisible light.

An illumination device to be mounted on a vehicle, according to an exemplary embodiment, comprises:

a light source;

a sensor configured to acquire information outside the vehicle based on invisible light; and a cover including a first portion covering the light source and a second portion covering the sensor, wherein the second portion has a lower visible light transmittance than the first portion.

According to this configuration, the second portion of the cover can function as a filter. Specifically, among the lights other than infrared light used by the sensor, in particular, the transmission of visible light can be suppressed. Such a filter is generally provided in the sensor itself in order to reduce the influence of the ambient light on the detection result. However, according to the above configuration, a part of the cover covering the light source and the sensor has such a filter function, and therefore, a structure related to the filter function can be omitted from the sensor. That is, the sensor can be downsized. In this way, it is possible to suppress an increase in size of the illumination device while providing the sensor for acquiring information outside the vehicle based on invisible light.

Furthermore, the second portion of the cover has a lower visible light transmittance than the first portion and therefore has a gray or black appearance. Thus, it is possible to make the sensor covered with the cover less visible from the outside of the cover. As a result, it is possible not only to suppress the degradation of merchantability from the viewpoint of design but also to provide a novel appearance in which a part of the cover is opaque.

The above-described illumination device can be configured as follows.

The sensor may be installed on the cover.

According to this configuration, the function of a filter provided on a detection surface of a LiDAR sensor is carried out by the second portion of the cover, and thus, the detection surface of the sensor can be made as close as possible to the cover. Compared with the configuration in which the sensor is disposed away from the cover, the area of the second portion necessary for securing the equivalent detection range can be reduced. That is, it is possible to minimize the required design change of the cover by incorporating the sensor. Further, since it is easy to avoid interference between the detection range and another component disposed in the lamp chamber covered with the cover, the degree of freedom in layout of the respective components in the lamp chamber that is a limited space is improved.

The above-described illumination device can be configured as follows.

The first portion and the second portion may be integrally molded.

That is, the first portion and the second portion exhibiting different colors can be formed by two-color molding. Compared with the configuration in which the cover is formed by combining the first portion and the second portion provided as separate members, an increase in manufacturing cost can be suppressed by reducing the assembling man-hour.

The sensor may be a LiDAR sensor.

The above-described illumination device can be configured as follows.

The cover may include a third portion disposed to face a front and rear direction of the vehicle and a fourth portion disposed to face a left and right direction of the vehicle, and the second portion may be located at a side end portion of the fourth portion remote from the third portion.

In addition or alternatively, the second portion can be located at a side end portion of the third portion remote from the fourth portion.

In addition or alternatively, the second portion can be located at an upper end portion of the third portion.

DETAILED DESCRIPTION

Hereinafter, an example of an embodiment according to the present invention will be described in detail with reference to the accompanying drawings. In each drawing used in the following description, the scale is appropriately changed in order to make each member recognizable size.

In the accompanying drawings, the arrow F indicates a forward direction of a structure shown, the arrow B indicates a rearward direction of a structure shown, the arrow U indicates an upward direction of a structure shown, the arrow D indicates a downward direction of a structure shown, the arrow L indicates a leftward direction of a structure shown, and the arrow R indicates a rightward direction of a structure shown. The "left" and the "right" used in the following description indicate the left and right directions as viewed from a driver's seat.

Figure 1:
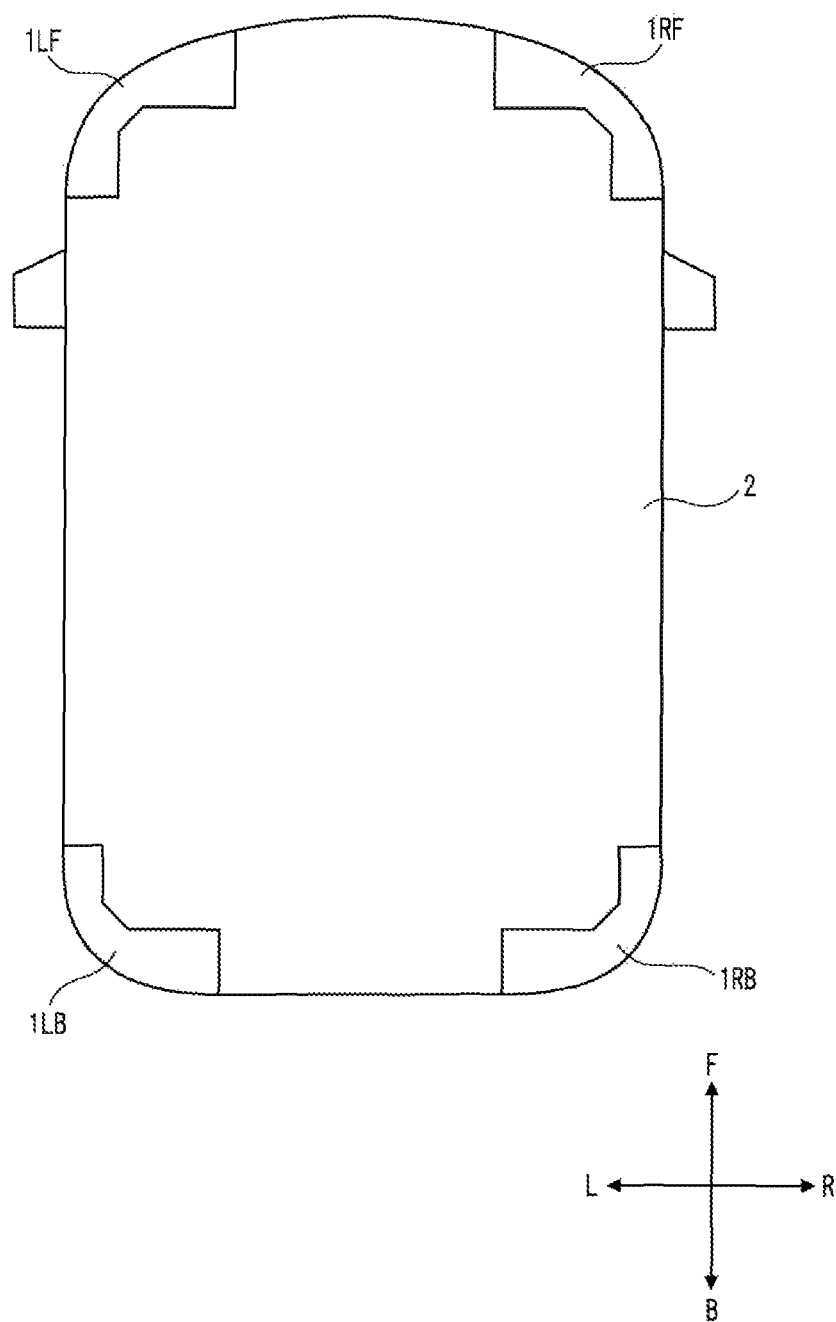
FIG. 1 is a view schematically showing a position of an illumination device according to an embodiment in a vehicle.

As shown in FIG. 1, a left front illumination device 1LF according to an embodiment is mounted on a left front corner portion of a vehicle 2, and a right front illumination device 1RF according to an embodiment is mounted on a right front corner portion of the vehicle 2.

Figure 2:
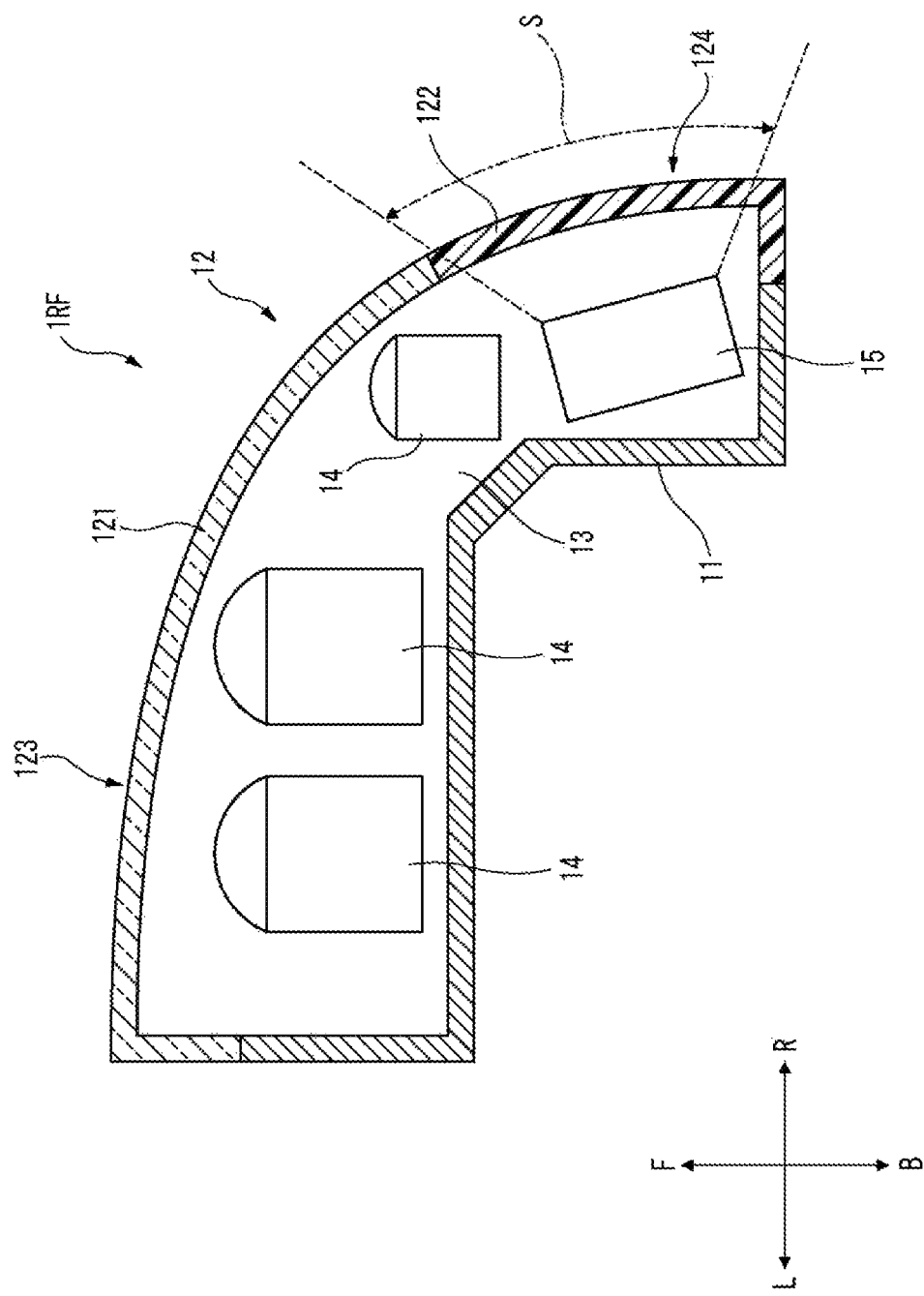
FIG. 2 is a view schematically showing one configuration of the illumination device shown in FIG. 1.

FIG. 2 schematically shows a configuration of the right front illumination device 1RF. Although not shown, the left front illumination device 1LF has a configuration that is bilateral symmetrical with the right front illumination device 1RF.

The right front illumination device 1RF includes a housing 11 and a translucent cover 12. The housing 11 and the translucent cover 12 define a lamp chamber 13.

The right front illumination device 1RF includes a light source 14. The light source 14 includes an optical system having at least one of a lens and a reflector, and emits light for illuminating a predetermined area. The light source 14 is disposed inside the lamp chamber 13. For the light source 14, a lamp light source or a semiconductor light emitting element can be used. Examples of the lamp light source can include an incandescent lamp, a halogen lamp, a discharge lamp, and a neon lamp and the like. Examples of the semiconductor light emitting element can include a light emitting diode, a laser diode, and an organic EL element and the like.

The right front illumination device 1RF includes a LiDAR sensor 15. The LiDAR sensor 15 has a configuration for emitting invisible light and a configuration for detecting return light as a result of the invisible light being reflected by an object existing outside the vehicle 2. The LiDAR sensor 15 includes a scanning mechanism that sweeps the invisible light by changing the emission direction (i.e., detection direction) as necessary. In the present embodiment, infrared light with a wavelength of 905 nm is used as the invisible light.

The LiDAR sensor 15 is a sensor for acquiring information outside the vehicle 2. For example, based on the time from the timing of emitting infrared light in a certain direction to the detection timing of the return light, it is possible to acquire a distance to an object associated with the return light. Further, it is possible to acquire information on the shape of an object associated with the return light by accumulating such distance data in association with the detection position. In addition or alternatively, based on the difference between the wavelengths of the emitted light and the return light, it is possible to acquire information on attributes such as the material of an object associated with the return light. In addition or alternatively, for example, based on the difference in reflectance of the return light from a road surface, it is possible to acquire information on the color (such as a white line on the road surface) of an object.

The LiDAR sensor 15 outputs a signal corresponding to the attribute (intensity, wavelength, etc.) of the return light detected. The above information is acquired by appropriately processing the signal outputted from the LiDAR sensor 15 by an information processing unit (not shown). The information processing unit may be provided in the right front illumination device 1RF or may be mounted on the vehicle 2.

The translucent cover 12 has a first portion 121 and a second portion 122. The first portion 121 is arranged so as to cover at least the light source 14. More specifically, the first portion 121 is arranged so as to cover at least an irradiation range (solid angle) of light emitted from the light source 14. The second portion 122 is arranged so as to cover at least the LiDAR sensor 15. More specifically, the second portion 122 is arranged so as to cover at least a detection range (solid angle) of the LiDAR sensor 15.

The light emitted from the light source 14 passes through the first portion 121 of the translucent cover 12 and illuminates a predetermined area outside the vehicle 2. At least a part of the wavelength of the light emitted from the light source 14 is included in the visible light region.

The infrared light emitted from the LiDAR sensor 15 passes through the second portion 122 of the translucent cover 12 and illuminates a predetermined area outside the vehicle 2. A range S indicated by a chain line in FIG. 2 represents a range that can be irradiated (detected). The return light as a result of being reflected by the irradiated object passes through the second portion 122 and is detected by the LiDAR sensor 15.

On the other hand, the transmittance of visible light in the second portion 122 is lower than the transmittance of visible light in the first portion 121. That is, the second portion 122 has wavelength selectivity for passing at least the wavelength of infrared light emitted from the LiDAR sensor 15 and the wavelength of return light detected by the LiDAR sensor 15.

According to this configuration, the second portion 122 of the translucent cover 12 can function as a filter. Specifically, among the lights other than infrared light used by the LiDAR sensor 15, in particular, the transmission of visible light can be suppressed. Here, the "suppressing" means including the case (zero transmittance) of not allowing the transmission of visible light.

Such a filter is generally provided in the sensor itself in order to reduce the influence of the ambient light on the detection result. On the other hand, in the present embodiment, a part of the translucent cover 12 that defines the lamp chamber 13 has such a filter function. Therefore, a structure related to the filter function can be omitted from the LiDAR sensor 15. That is, the LiDAR sensor 15 can be downsized. In this way, it is possible to suppress an increase in size of the right front illumination device 1RF while providing the LiDAR sensor 15 for acquiring information outside the vehicle 2 based on invisible light.

Furthermore, the second portion 122 of the translucent cover 12 has a lower visible light transmittance than the first portion 121 and therefore has a gray or black appearance. Thus, it is possible to make the LiDAR sensor 15 disposed in the lamp chamber 13 less visible from the outside of the lamp chamber 13. As a result, it is possible not only to suppress the degradation of merchantability from the viewpoint of design but also to provide a novel appearance in which a part of the translucent cover 12 is opaque.

In the present embodiment, the first portion 121 and the second portion 122 of the translucent cover 12 are integrally molded.

That is, the first portion 121 and the second portion 122 exhibiting different colors can be formed by two-color molding. Compared with the configuration in which the translucent cover 12 is formed by combining the first portion 121 and the second portion 122 provided as separate members, an increase in manufacturing cost can be suppressed by reducing the assembling man-hour.

Figure 3:
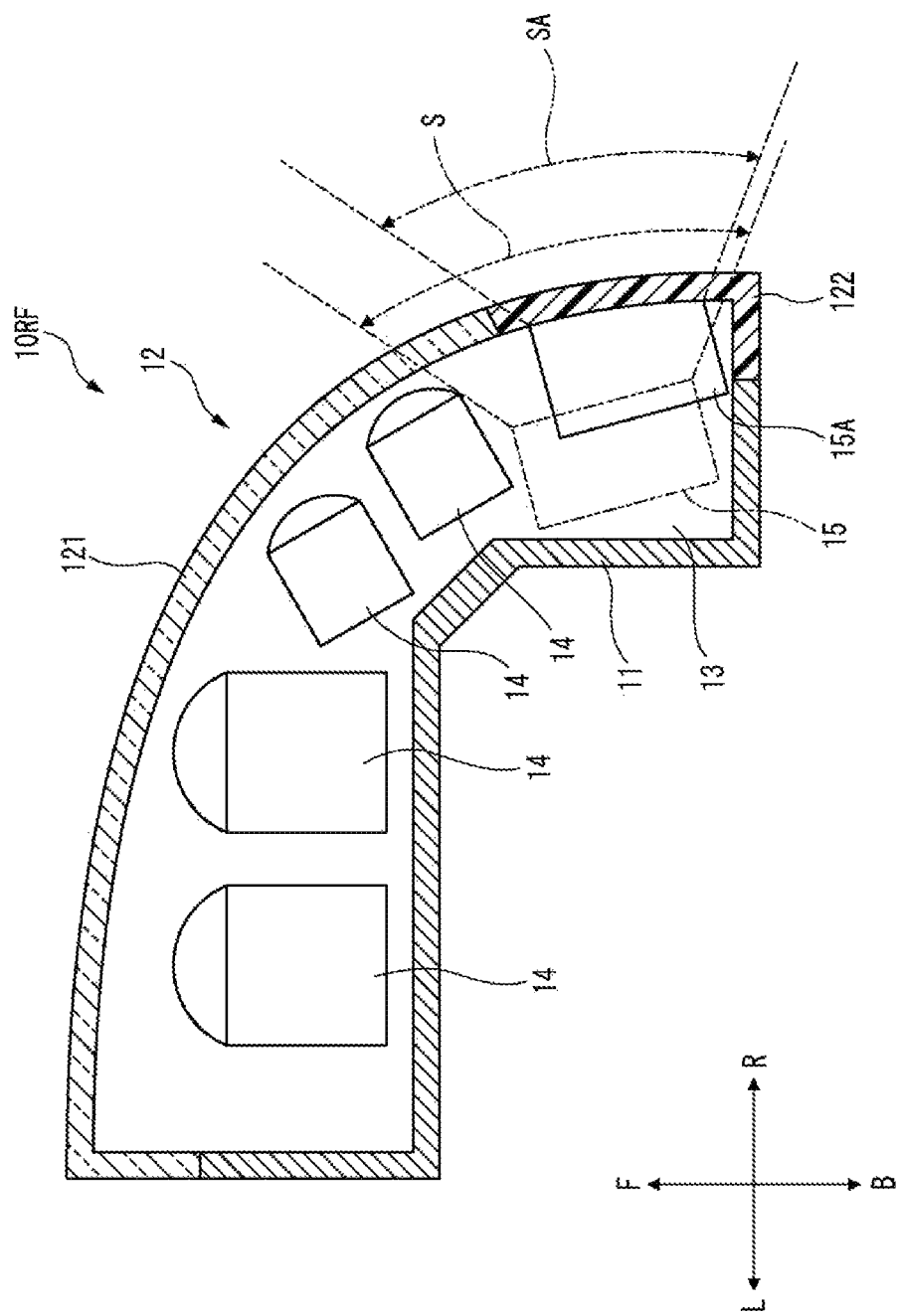
FIG. 3 is a view showing a modification of the illumination device shown in FIG. 1.

FIG. 3 schematically shows a configuration of a right front illumination device 10RF according to a modification. The constituent elements that are the same as or equivalent to the above-described right front illumination device 1RF are denoted by the same reference numerals, and repetitive explanations will be omitted.

The right front illumination device 10RF includes a LiDAR sensor 15A. The LiDAR sensor 15A is installed on the second portion 122 of the translucent cover 12. An installation means can be appropriately selected.

Since the function of a filter provided on a detection surface of the LiDAR sensor is carried out by the second portion 122 of the translucent cover 12, the detection surface of the LiDAR sensor 15 can be made as close as possible to the translucent cover 12. The detection surface and the second portion 122 may be in close contact with each other, or an interval may be present between the detection surface and the second portion 122.

Compared with the position indicated by a two-dot chain line of the LiDAR sensor 15 shown in FIG. 2, it can be found that the area of the second portion 122 necessary for securing a detection range SA equivalent to the detection range S can be reduced. That is, by arranging the LiDAR sensor 15A in the lamp chamber 13, it is possible to minimize the required design change of the translucent cover 12.

Further, compared with the position indicated by a two-dot chain line of the LiDAR sensor 15 shown in FIG. 2, it can be found that it is easy to avoid interference between the detection range SA and another device (the light source 14 in the illustrated example) disposed in the lamp chamber 13. That is, the degree of freedom in layout of the respective components in the lamp chamber 13 that is a limited space is improved.

The above embodiment is merely an example for facilitating the understanding of the present invention. The configuration according to the above embodiment can be appropriately modified and improved without departing from the gist of the present invention. Further, it is obvious that the equivalents fall within the technical scope of the present invention.

In the above embodiment, the first portion 121 and the second portion 122 of the translucent cover 12 are integrally molded. However, the translucent cover 12 may be formed by integrating the first portion 121 and the second portion 122 provided as separate members through adhesion, welding, or fitting or the like.

Figure 4A:
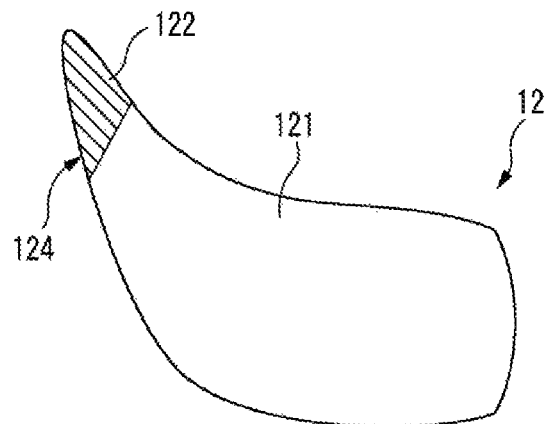
FIGS. 4A to 4C are views showing a modification of the illumination device shown in FIG. 1.
Figure 4A:
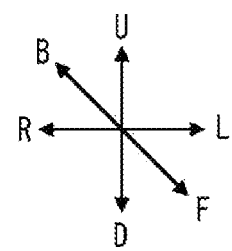

As shown in FIG. 2, the translucent cover 12 has a third portion 123 disposed to face a front and rear direction of the vehicle 2 and a fourth portion 124 disposed to face a left and right direction of the vehicle 2. As shown in FIG. 4A, in the above embodiment, the second portion 122 is located at a side end portion (i.e., a side end portion of the translucent cover 12 located on the outer side in a vehicle width direction of the vehicle 2) of the fourth portion 124 remote from the third portion 123.

Figure 4B:
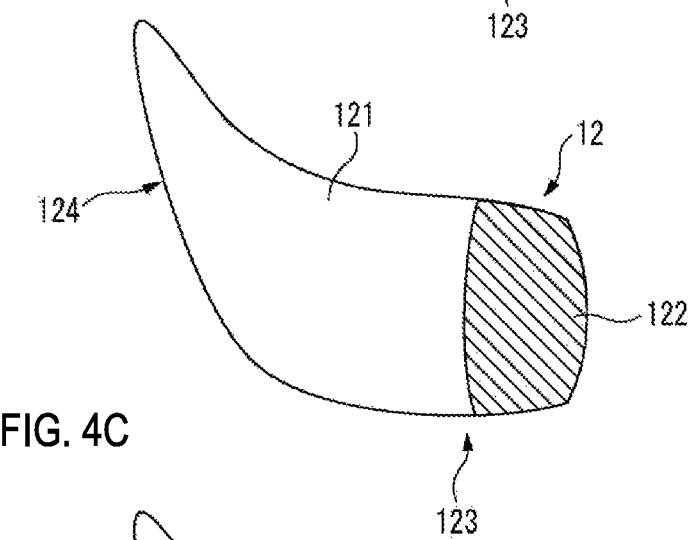
Figure 4B:
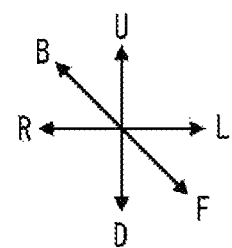
Figure 4C:
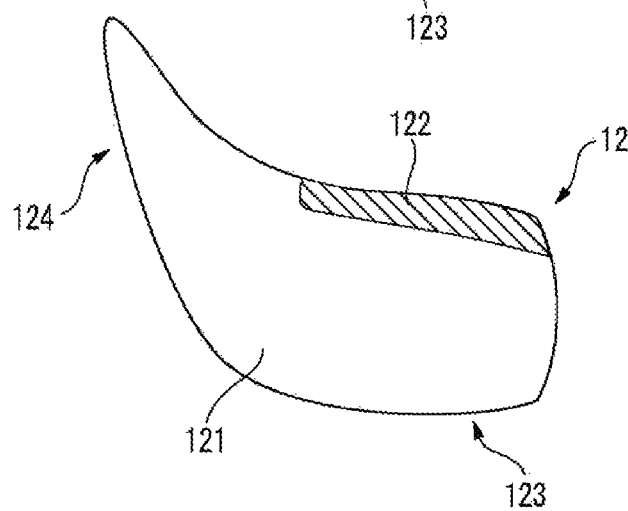
Figure 4C:
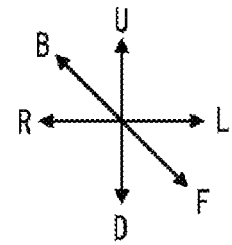

However, the position of the second portion 122 can be appropriately changed in accordance with the specification of the LiDAR sensor 15 or the object to be detected. For example, as shown in FIG. 4B, the second portion 122 may be located at a side end portion (i.e., a side end portion of the translucent cover 12 located on the inner side in the vehicle width direction of the vehicle 2) of the third portion 123 remote from the fourth portion 124. Alternatively, as shown in FIG. 4C, the second portion 122 may be located at an upper end portion of the third portion 123. The respective configurations shown in FIGS. 4A to 4C can be appropriately combined.

In the above embodiment, the LiDAR sensor is used as a sensor for acquiring information outside the vehicle 2. However, the sensor to be used can also be appropriately selected according to the type of information to be acquired, as long as it is based on invisible light. For example, an infrared camera can be adopted.

In the above embodiment, the left front illumination device 1LF and the right front illumination device 1RF have been described as an example of the illumination device including the LiDAR sensor 15. However, the configuration described with reference to the right front illumination device 1RF can be applied to a left rear illumination device 1LB disposed on a left rear corner of the vehicle 2 shown in FIG. 1 and a right rear illumination device 1RB disposed on a right rear corner of the vehicle 2. For example, the right rear illumination device 1RB has a configuration that is longitudinal symmetrical with the right front illumination device 1RF (light source is appropriately changed). The left rear illumination device 1LB has a configuration that is bilateral symmetrical with the right rear illumination device 1RB.

What is claimed is:

1. An illumination device to be mounted on a vehicle, comprising:
    a light source;
    a sensor configured to acquire information outside the vehicle based on invisible light; and
    a cover including a first portion covering the light source and a second portion covering the sensor,
    wherein the sensor is configured to receive light through a part of the second portion that has a lower visible light transmittance than the first portion.

2. The illumination device according to claim 1, wherein the sensor is installed on the cover.

3. The illumination device according to claim 1, wherein the first portion and the second portion are integrally molded.

4. The illumination device according to claim 1, wherein the sensor is a LiDAR sensor.

5. The illumination device according to claim 1,
    wherein the cover includes a third portion disposed to face a front and rear direction of the vehicle and a fourth portion disposed to face a left and right direction of the vehicle, and
    wherein the second portion is located at a side end portion of the fourth portion remote from the third portion.

6. The illumination device according to claim 1,
    wherein the cover includes a third portion disposed to face a front and rear direction of the vehicle and a fourth portion disposed to face a left and right direction of the vehicle, and
    wherein the second portion is located at a side end portion of the third portion remote from the fourth portion.

7. The illumination device according to claim 1,
    wherein the cover includes a third portion disposed to face a front and rear direction of the vehicle and a fourth portion disposed to face a left and right direction of the vehicle, and
    wherein the second portion is located at an upper end portion of the third portion.

* * * * *